United States Patent

[11] 3,633,958

[72] Inventor: Verti Mesrobian
7120 Lexington, Detroit, Mich. 48209
[21] Appl. No.: 51,157
[22] Filed: June 30, 1970
[45] Patented: Jan. 11, 1972

[54] LEAF PICKER
1 Claim, 4 Drawing Figs.

[52] U.S. Cl. ............................................. 294/61, 294/50
[51] Int. Cl. ............................................. A01d 9/06
[50] Field of Search ............................. 294/50, 61

[56] References Cited
UNITED STATES PATENTS
2,738,215  3/1956  Thompson ............... 294/61
1,246,487  11/1917  Summers et al. ......... 294/61

Primary Examiner—Richard E. Aegerter
Assistant Examiner—Johnny D. Cherry
Attorney—Cullen, Settle, Sloman & Cantor ABSTRACT: A manually operated leaf picker which enables a user to go about a lawn or field and without bending to pick up large quantities of leaves by manual manipulation of the handles of the leaf picker, with such manipulation including also the stripping of leaves off the picker and into a suitable receptacle.

PATENTED JAN 11 1972

3,633,958

INVENTOR
VERDI MESROBIAN

BY Gallen, Settle, Sloman & Panta
ATTORNEYS

LEAF PICKER

BACKGROUND OF THE INVENTION

This application relates to leaf pickers.

The removal of leaves from a lawn is a tedious and laborious task. Known methods for removing leaves from lawns include rake, sweepers, and a miscellanea of other devices.

In this application, I disclose a leaf picker whose picker elements include a picker plate of large area on whose lower surface are exposed sharp pointed spikes for picking the leaves and spearing them and gathering them to the picker plate, with the latter being held in the hand of the user by means of an upwardly projecting handle with a cross grip.

An additional element of the picker means hereof is a stripper plate which strips leaves off the spikes and which can be manipulated by the user's hand.

An embodiment of the invention has been disclosed in the appended drawing. In this drawing:

FIG. 1 is an elevation section view of the leaf picking means;

FIGS. 2, 3 and 4 are respectively cross-sectional views as if on lines 22, 33 and 44 of FIG. 1.

DETAILED DESCRIPTION

Figure 1:
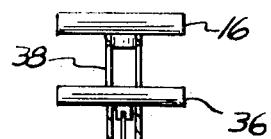
Figure 2:
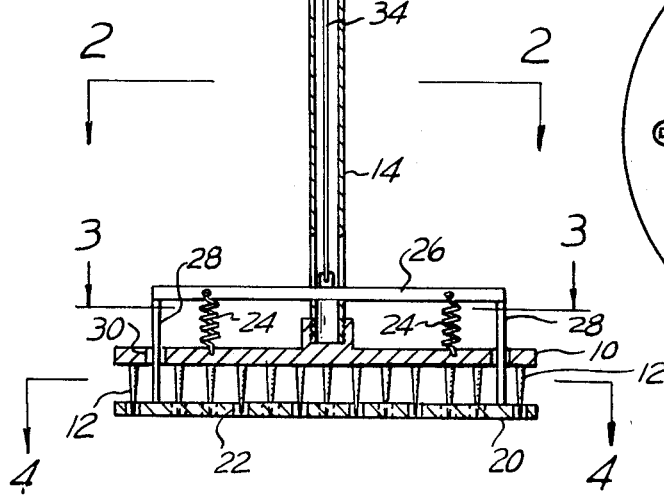
Figure 2:
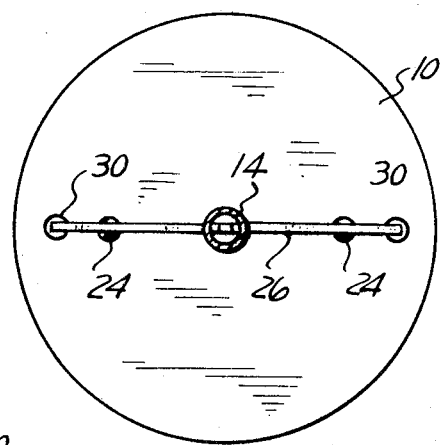
Figure 3:
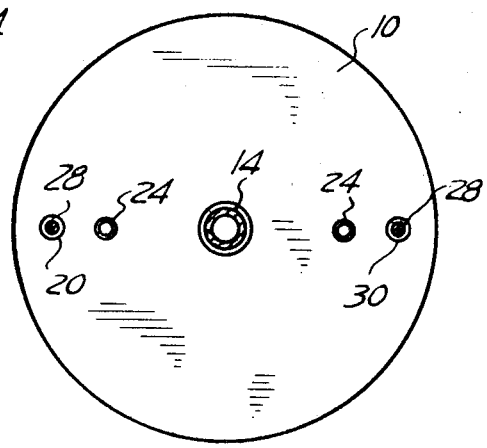
Figure 4:
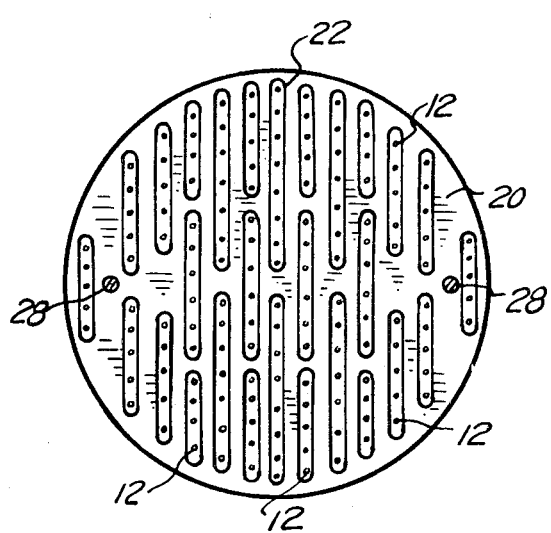

The drawing shows a leaf picking means comprising a picker plate 10 of large area such as about 2 feet in diameter on whose under surface are large number of downwardly projecting spikes 12 having lower sharp points. Projecting upwardly from the picker plate 10 is a handle tube 14 having a cross grip 16 at its upper end.

The parts described thus far form a picking means. A user may walk around a lawn and by clamping down the picker plate and its spikes into a mass of leaves can spear a large number of leaves on the spikes and this is the picking action.

For stripping the leaves off the spikes, there is a provided a stripper means which will now be described. The stripper means comprises a stripper plate 20 of the same area as and under the picker plate 10 and having a plurality of perforations 22, through which all of the spikes may be projected downwardly. Springs 24 normally bias plates 10 and 20 apart relatively.

Means are provided for overpowering the springs 24 and for holding the plates closely adjacent. Such means comprises a U-shaped cross member 26 lying over and above the picker plate 10 with its legs 28 projected down through apertures 30 of the picker plate and fixedly connected to the stripper plate at their lower ends.

Projecting upwardly from the cross piece 26 is a pull wire 34 located within tube 14.

At the upper end of the wire, but below and spaced from the handle cross grip 16 is a wire cross grip 36. The upper end of the tube 14 has opposed elongated longitudinal extending slots 38 in which are disposed and moved longitudinally the ends of the pull wire cross grip 36.

The two cross grips 36 and 16 may be squeezed together with one hand of the user for holding the stripper plate 20 up against the picker plate 10 so as to expose the spikes 12 of the picker plate 10. Release of the hand squeeze on the cross grip 16 and 36 enables the springs 24 to bias the stripper plate 20 down and away from the picker plate 10 to strip leaves down and off the spikes.

Now having described the leaf picking means herein disposed, reference should be had to the claims which follow.

I claim:

1. Leaf picking means comprising:
   a picker plate of large area on whose under surface are a large number of downwardly projecting spikes having a lower sharp points;
   a handle tube projecting upwardly from the picker plate a considerable distance and having a cross grip at its upper end;
   a stripper plate of the same area as and under said picker plate, and having a plurality of perforations through which all of said spikes may be projected downwardly;
   springs normally biasing said plates apart relatively;
   and means for overpowering said springs and for holding the plates closely adjacent, and comprising a U-shaped cross member lying over and above the picker plate with its legs projected down through apertures of the picker plate and fixedly connected to the stripper plate;
   a pull wire projecting upwardly from the crosspiece and located within said tube; and having a cross grip at its upper end below and spaced from the handle cross grip;
   with the upper end of the tube having opposed elongated longitudinally extending slots in which are disposed and move longitudinally the ends of the pull wire cross grip;
   said springs at their ends respectively interconnecting said crosspiece and picker plate;
   whereby the two cross grips may be squeezed together with one hand tensioning said springs for holding the stripper plate up against the picker plate so as to expose the spikes of the picker plate; with release of the hand squeeze enabling the springs to bias the stripper plate down and away from the picker plate to strip leaves down and off the spikes.

* * * * *